May 2, 1961
J. C. HAMILTON ET AL
2,982,522
WATER COOLED GLASS STIRRER
Filed June 5, 1957
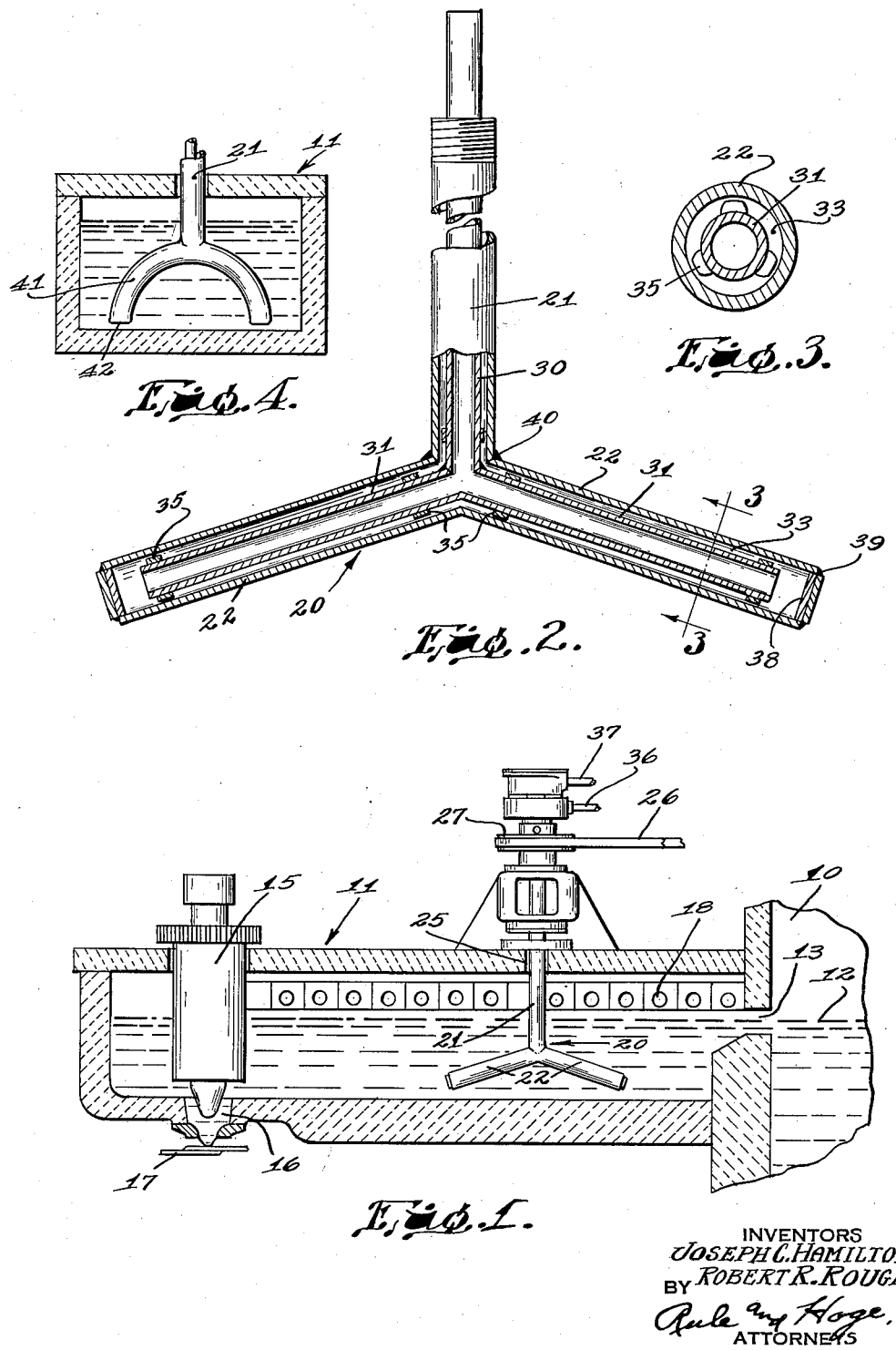
INVENTORS
JOSEPH C. HAMILTON
ROBERT R. ROUGH
BY
*Rule and Hoge,*
ATTORNEYS

United States Patent Office 2,982,522
Patented May 2, 1961

2,982,522
WATER COOLED GLASS STIRRER

Joseph C. Hamilton and Robert R. Rough, Toledo, Ohio, assignors to Owens-Illinois Glass Company, a corporation of Ohio Filed June 5, 1957, Ser. No. 663,677
1 Claim. (Cl. 257—104)

Our invention relates to stirring apparatus adapted for stirring molten glass flowing through a channel, particularly the channel of a furnace forehearth.

Various stirring devices are in common use for stirring the glass flowing through furnace forehearths, to counteract the tendency of the glass to form cold streaks or cords and to obtain homogeneity of the glass being drawn from the forehearth. Such stirring devices are also useful for mixing colorant materials added to the stream of glass as it issues from the furnace tank into the forehearth. The glass as it flows through the forehearth is maintained at the required high temperature by burners supplying heat to the surface of the flowing glass. At lower levels the glass is at a lower temperature and the rate of flow reduced. Cooler glass tends to settle toward the bottom of the channel and also forms cold streaks or cords.

Stirring devices made of refractory materials which will withstand the high temperatures of the molten glass have been found unsatisfactory and inadequate as a means for stirring the lower strata of glass in the channel, for mixing the glass. These refractory stirrers are limited as to the depth to which they can be used, particularly because of breakage due to the contact with feeder refractories. Attempts have been made to overcome this difficulty by making stirrers of metal of adequate strength. Such stirrers must be provided with means for circulating water or other cooling medium therethrough, to withstand the high temperature of the glass. Such a stirring device, substantially in the form of an inverted T has been tried. This device comprises a vertical tubular stem which is rotated about its axis and horizontal extensions or arms which rotate in a horizontal plane adjacent the floor of the forehearth. We have discovered that such a stirrer causes undue chilling and freezing of the glass near the center of the stirring zone as the glass in this region is comparatively stagnant and in close proximity to the cooled stirring device.

A primary object of the present invention is to overcome the above difficulty. For this purpose the invention provides a stirrer comprising a vertical tubular body with downwardly and outwardly extending arms or sections branching therefrom. These stirring arms reach downward into the lower strata of glass and operate to produce a strong movement of the glass substantially at right angles to the general direction of flow through the channel and transverse to the cords in the flowing glass. The central portion of the stirrer is spaced above the channel floor a sufficient distance to prevent objectionable cooling.

Other objects of the invention will appear hereinafter.

Referring to the accompanying drawings:
Fig. 1 is a sectional elevation of a furnace forehearth equipped with a preferred form of stirring device;
Fig. 2 is a part sectional elevation of the stirring device with parts broken away;

Fig. 3 is a section at the line 3—3 on Fig. 2; and
Fig. 4 is a cross section of the forehearth with a modified form of stirrer therein.

Referring to Fig. 1, a glass melting and refining tank 10 is equipped with a forehearth 11. Molten glass 12 flows through an outlet 13 into the forehearth. A glass feeder 15 controls the discharge of the glass through a bottom outlet 16, the glass being severed by shears 17 as it issues to form individual mold charges. The temperature of the glass flowing through the forehearth is regulated and controlled by temperature regulating devices 18 distributed along the forehearth. These may include burners and also cooling nozzles.

The stirring device 20 comprises a vertical shaft or stem 21 with lateral arms 22 branching therefrom. These divergent arms 22 are downwardly and outwardly inclined so that their outer ends are at a lower level than the inner ends adjoining the stem 21.

As shown in Fig. 1 the stirrer is mounted in the forehearth with the vertical shaft or stem 21 extending through an opening 25 in the roof of the channel 11. The stirrer is rotated continuously about its axis by means of a driving belt 26 running on a pulley 27 keyed to the shaft 21.

In order to prevent overheating of the stirrer it is necessary to use some cooling system. For this purpose means are provided for circulating a cooling medium, preferably water, through the stirrer. The system includes an inner pipe or tube 30 within the tube 21 and branch pipes or tubes 31 within the arms 22. These inner tubes 30 and 31 being of smaller diameter than the outer surrounding tubes, provide annular channels 33. Spacing lugs 35 attached to the inner tubes 31 maintain the latter in spaced, concentric relation to the surrounding tubes. Water or other cooling fluid is supplied through a pipe 36 and flows downwardly through the annular channels 33 and is returned through the inner pipes 31 and 30 and discharged through a pipe 37. The outer ends of the arms 22 are closed by end plates 38. These may be welded as indicated at 39 to the tubes. The branch pipes 22 may also be welded to the stem 21 by a weld 40.

As shown in Fig. 1 the stirring arms 22 have their outer ends in close proximity to the floor of the forehearth so that rotation of the stirrer is effective to stir the lower and cooler portions of the glass, eliminating cords and unevenness so that the glass reaching the outlet 16 is homogeneous and of uniform temperature. The lower end of the central stem 21 is spaced above the floor of the forehearth a sufficient distance to maintain it in the comparatively hot, fluent, freely flowing glass, so that there is no freezing or objectionable chilling of the glass at this point.

Fig. 4 illustrates a modified construction in which arms 41, branching from the stem 21 and extending downwardly, are outwardly curved, the two arms together forming substantially a semicircle with its center of curvature in the vertical axis of the stem 21. In this form the lower end surfaces 42 of the arms are horizontal. It will be noted that in this modification the lower end of the stem 21 is at a comparatively high level relative to the upper surface of the glass. The number of stirring arms 22 or 41 may be increased or decreased if desired.

In any of these forms of generally T-type stirring devices, the glass from the upper levels of the body of glass in the forehearth is drawn downwardly by the stirrer and then moved angularly away from the stirrer at or near the floor level of the forehearth channel.

The rate of mixing can be accelerated by lengthening the arms 22 to thus increase the peripheral speed of the outer ends of said arms. Consequently the control of the mixing may be obtained by varying the length of these arms 22.

Modifications may be resorted to within the spirit and scope of our invention.

We claim:

The combination including means providing a horizontally disposed channel through which molten material is caused to flow, a stirring device comprising a vertical tubular stem, means for mounting said stirring device for rotation about the vertical axis of said stem with said stem extending downwardly into the channel, at least one pair of stirring arms branching from said stem at the lower end thereof and extending outwardly and downwardly from said stem into the flowing molten material, said arms having free lower end portions disposed adjacent the floor of said channel, said stem and arms consisting of metal and being of tubular construction, means for closing and sealing the lower free ends of said arms, and means for circulating a cooling fluid through said stem and arms, the said stem and arms together being substantially in the form of an inverted letter Y, the lower free end portions of said arms adapted to rotary movement in a plane adjacent and coparallel with said channel bottom.

References Cited in the file of this patent

UNITED STATES PATENTS

| | | |
|---|---|---|
| 203,047 | Howe | Apr. 30, 1878 |
| 1,479,511 | Parsons | Jan. 1, 1924 |
| 1,690,998 | Soubier | Nov. 6, 1928 |
| 1,962,803 | Bruins | June 12, 1934 |
| 2,022,223 | Taylor | Nov. 26, 1935 |
| 2,061,367 | Morton | Nov. 17, 1936 |
| 2,189,271 | Rowe | Feb. 6, 1940 |
| 2,394,893 | Brown | Feb. 12, 1946 |
| 2,800,974 | Gilman et al. | July 30, 1957 |
| 2,896,926 | Chap | July 28, 1959 |